United States Patent
Song et al.

(10) Patent No.: US 9,231,240 B2
(45) Date of Patent: Jan. 5, 2016

(54) BATTERY UNIT AND BATTERY MODULE USING THE SAME

(71) Applicant: Samsung SDI Co., Ltd., Yongin-si, Gyeonggi-do (KR)

(72) Inventors: Jang-Hyun Song, Yongin-si (KR); Yong-Sam Kim, Yongin-si (KR); Jong-Woo Nam, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 23 days.

(21) Appl. No.: 14/049,160

(22) Filed: Oct. 8, 2013

(65) Prior Publication Data

US 2014/0302381 A1 Oct. 9, 2014

(30) Foreign Application Priority Data

Apr. 8, 2013 (KR) .................. 10-2013-0038283

(51) Int. Cl.
| | |
|---|---|
| *H01M 2/24* | (2006.01) |
| *H01M 2/20* | (2006.01) |
| *H01M 2/30* | (2006.01) |

(Continued)

(52) U.S. Cl.
CPC .............. *H01M 2/202* (2013.01); *H01M 2/024* (2013.01); *H01M 2/06* (2013.01); *H01M 2/1077* (2013.01); *H01M 2/206* (2013.01); *H01M 2/263* (2013.01); *H01M 2/30* (2013.01); *H01M 2/305* (2013.01); *H01M 2/08* (2013.01); *H01M 2/20* (2013.01); *H01M 2/204* (2013.01); *H01M 2/22* (2013.01)

(58) Field of Classification Search
CPC ............ H01M 2/20; H01M 2/22; H01M 2/30
See application file for complete search history.

(56) References Cited

U.S. PATENT DOCUMENTS

| | | |
|---|---|---|
| 2010/0081048 A1 | 4/2010 | Nansaka et al. |
| 2010/0173190 A1 | 7/2010 | Tsuchiya |

(Continued)

FOREIGN PATENT DOCUMENTS

| | | |
|---|---|---|
| DE | 10 2010 062 183 A1 | 5/2012 |
| EP | 2 357 686 A1 | 8/2011 |

(Continued)

OTHER PUBLICATIONS

EPO Search Report dated Jul. 2, 2014, for corresponding European Patent application 13195587.4, (7 pages).

(Continued)

*Primary Examiner* — Jane Rhee
(74) *Attorney, Agent, or Firm* — Christie, Parker & Hale, LLP

(57) ABSTRACT

A battery unit includes a case accommodating an electrode assembly, the case having an opening and a cap plate for covering the opening, the cap plate having a terminal insertion portion. The battery unit further includes a terminal member inserted into the case through the terminal insertion portion from an outside of the case and coupled to the electrode assembly, the terminal member including a current collector electrically coupled to the electrode assembly; a terminal portion extending parallel to an upper surface of the cap plate to an outside of the cap plate; and a connection portion electrically coupled to the current collector and to the terminal portion. The battery unit further includes a fixing member in the terminal insertion portion and fixing the terminal member to the cap plate, the fixing member including injection-molded plastic resin in the terminal insertion portion and surrounding the terminal member.

26 Claims, 14 Drawing Sheets

(51) Int. Cl.
*H01M 2/06* (2006.01)
*H01M 2/02* (2006.01)
*H01M 2/10* (2006.01)
*H01M 2/26* (2006.01)
*H01M 2/22* (2006.01)
*H01M 2/08* (2006.01)

(56) References Cited

U.S. PATENT DOCUMENTS

| | | |
|---|---|---|
| 2011/0045345 A1 | 2/2011 | Tsuchiya et al. |
| 2011/0070466 A1 | 3/2011 | Park et al. |
| 2011/0244309 A1* | 10/2011 | Byun et al. ............ 429/158 |
| 2011/0300414 A1 | 12/2011 | Baek |
| 2012/0156536 A1 | 6/2012 | Yamazaki et al. |
| 2012/0328932 A1 | 12/2012 | Guen et al. |
| 2013/0078506 A1 | 3/2013 | Guen |
| 2013/0323591 A1 | 12/2013 | Woehrle et al. |

FOREIGN PATENT DOCUMENTS

| | | |
|---|---|---|
| EP | 2 429 011 A1 | 3/2012 |
| EP | 2 495 784 A2 | 9/2012 |
| JP | 2005-339990 A | 12/2005 |
| JP | 2006-216411 | 8/2006 |
| JP | 2006-236790 A | 9/2006 |
| JP | 2008-311014 A | 12/2008 |
| JP | 2009-283256 A | 12/2009 |
| JP | 2010-80355 A | 4/2010 |
| JP | 2010-272324 | 12/2010 |
| JP | 2010-282847 A | 12/2010 |
| JP | 2011-23142 | 2/2011 |
| WO | WO2012/169055 A1 | 12/2012 |

OTHER PUBLICATIONS

Patent Abstracts of Japan, and English machine translation of Japanese Publication 2010-272324 dated Dec. 2, 2010, listed above, (15 pages).

EPO Search Report dated Aug. 6, 2014, for European Patent application 13195605.4, (6 pages).

EPO Search Report dated Aug. 21, 2014, for European Patent application 13195590.8, (8 pages).

Patent Abstracts of Japan, and English machine translation of Japanese Publication 2011-23142 dated Feb. 3, 2011, (31 pages).

EPO Search Report dated Nov. 3, 2014, corresponding to European Patent application 13195587.4, (12 pages).

English Machine Translation of Japanese Patent Publication No. 2005-339990 A, dated Dec. 8, 2005, 40 pages.

English Machine Translation of Japanese Patent Publication No. 2006-236790 A, dated Sep. 7, 2006, 36 pages.

English Machine Translation of Japanese Patent Publication No. 2010-282847 A, dated Dec. 16, 2010, 59 pages.

EPO Search Report dated Dec. 11, 2014, corresponding to European Patent application 13195590.8, (14 pages).

Patent Abstracts of Japan, and English machine translation of Japanese Publication 2006-216411 dated Aug. 17, 2006, (14 pages).

U.S. Office action dated May 20, 2015, for cross references U.S. Appl. No. 14/048,943, (10 pages).

EPO Office action dated Aug. 26, 2015, corresponding to European Patent application 13195590.8, (11 pages).

U.S. Notice of Allowance dated Sep. 10, 2015, for cross reference U.S. Appl. No. 14/048,943, (8 pages).

* cited by examiner

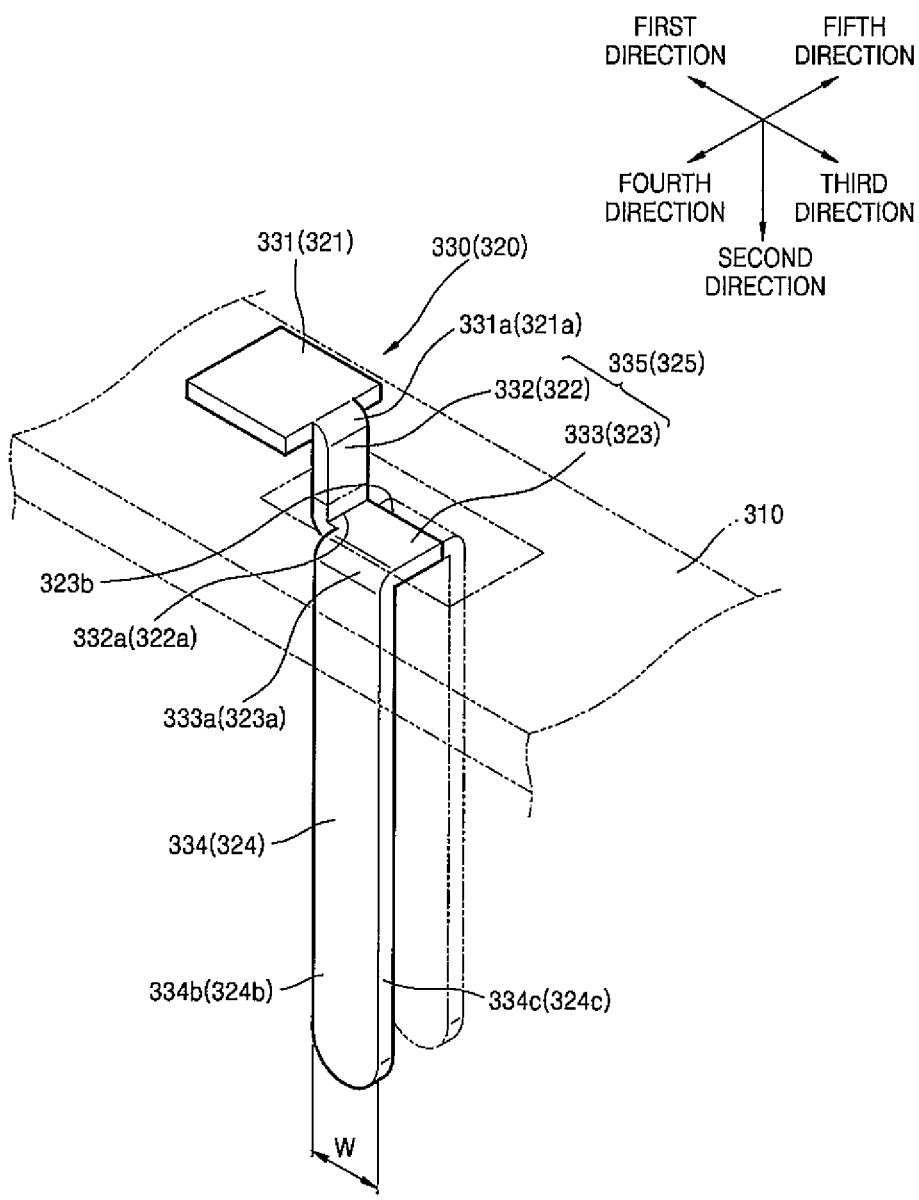

BATTERY UNIT AND BATTERY MODULE USING THE SAME

CROSS-REFERENCE TO RELATED APPLICATIONS

This application claims priority to and the benefit of Korean Patent Application No. 10-2013-0038283, filed on Apr. 8, 2013, in the Korean Intellectual Property Office, the disclosure of which is incorporated herein in its entirety by reference. In addition, the present application incorporates herein by reference the entire contents of U.S. patent application Ser. No. 14/049,084, entitled BATTERY UNIT AND BATTERY MODULE USING THE SAME, filed on even date herewith; and U.S. patent application Ser. No. 14/048,943, entitled BATTERY UNIT AND BATTERY MODULE USING THE SAME, filed on even date herewith.

BACKGROUND

1. Field

One or more embodiments of the present invention relate to a battery unit and a battery module using a plurality of the battery units coupled with each other.

2. Description of the Related Art

In general, secondary batteries can be discharged and recharged repeatedly, unlike primary batteries that are not designed to be recharged. Secondary batteries are used as energy sources for mobile devices, electric vehicles, hybrid cars, electric bikes, uninterruptable power supplies, etc. Also, secondary batteries are used in the form of a single battery or a battery module in which a plurality of batteries are electrically coupled in a single unit by using a bus bar, in accordance with the type of external device adopting the secondary battery.

A compact mobile device such as a mobile phone with output and capacity of a single battery may operate for a predetermined time. However, when longer duration operations or high power operations are needed, as in electric vehicles or hybrid cars, a battery module is often used to prevent an output or capacity problem. The battery module may increase an output voltage or an output current according to the number of batteries included in the battery module. The battery module may reach a desired output voltage or output current by coupling a plurality of batteries in series or in parallel.

SUMMARY

One or more embodiments of the present invention include a battery unit having an improved electrode terminal assembly, which may reduce manufacturing costs, and a battery module using the battery unit.

Additional aspects of embodiments of the present invention will be set forth in part in the description which follows and, in part, will be apparent from the description, or may be learned by practice of the presented embodiments of the present invention.

According to one or more embodiments of the present invention, a battery unit includes a case accommodating an electrode assembly, the case having an opening, and a cap plate covering the opening, the cap plate having a terminal insertion portion. The battery unit may further include a terminal member inserted into the case through the terminal insertion portion from an outside of the case and coupled to the electrode assembly, the terminal member including a current collector electrically coupled to the electrode assembly; a terminal portion extending parallel to an upper surface of the cap plate to an outside of the cap plate; and a connection portion electrically coupled to the current collector and to the terminal portion. The battery unit further includes a fixing member in the terminal insertion portion fixing the terminal member to the cap plate, the fixing member having injection-molded plastic resin in the terminal insertion portion and surrounding the terminal member.

The terminal portion may be separated from the upper surface of the cap plate.

The terminal portion may extend in a direction along a major side of the cap plate.

The connection portion may include a first bending portion extending downwardly from the terminal portion, and a second bending portion extending in the direction along the major side from the first bending portion. In some embodiments, the current collector may extend downwardly from an edge of the second bending portion in a direction along a minor side of the cap plate.

The second bending portion may be partially buried in the fixing member.

The second bending portion may be entirely buried in the fixing member.

The fixing member may include a first fixing portion filling the terminal insertion portion, and a second fixing portion filling a gap between the terminal portion and the upper surface of the cap plate.

The second fixing portion may extend to an upper portion of the first fixing portion.

The second fixing portion may be located over an edge of the terminal insertion portion.

The terminal member may include a positive terminal member and a negative terminal member.

The positive terminal member and the negative terminal member may each include a metal. In some embodiments, the metal of the positive terminal member and the negative terminal member is the same.

The positive terminal member and the negative terminal member may include dissimilar metals.

The positive terminal member may include aluminum (Al) and the negative terminal member may include copper (Cu).

The battery unit may include a welding layer on an upper surface of one of the positive terminal member or the negative terminal member. In some embodiments, the welding layer may include the same metal as that of any one of the positive terminal member or the negative terminal member and may be located on an upper surface of the other one of the positive terminal member or the negative terminal member including a dissimilar metal than the welding layer.

According to one or more embodiments of the present invention, a battery module includes a plurality of battery units and a bus bar. The battery units of the plurality of battery units each includes a case accommodating an electrode assembly, the case having an opening, and a cap plate covering the opening, the cap plate having a terminal insertion portion. Each battery unit may further include a terminal member inserted into the case through the terminal insertion portion from an outside of the case and coupled to the electrode assembly, the terminal member including a current collector electrically coupled to the electrode assembly; a terminal portion extending parallel to an upper surface of the cap plate to an outside of the cap plate; and a connection portion electrically coupled to the current collector and to the terminal portion. Each battery unit further includes a fixing member in the terminal insertion portion fixing the terminal member to the cap plate, the fixing member having injection-molded plastic resin in the terminal insertion portion and surrounding the terminal member. The bus bar may couple the terminal portions of the battery units of the plurality of battery units to respective neighboring battery units of the plurality of battery units.

The terminal portion of each of the battery units of the plurality of battery units may be separated from the upper surface of its respective cap plate.

The terminal portion of each of the battery units of the plurality of battery units may extend in a direction along a major side of its respective cap plate.

The fixing member of each battery unit of the plurality of battery units may include a first fixing portion filling the terminal insertion portion and a second fixing portion filling a gap between the terminal portion and the upper surface of the cap plate.

The second fixing portion of the fixing member may extend to an upper portion of the first fixing portion.

The second fixing portion of the fixing member may be located over an edge of the terminal insertion portion.

The bus bar of the battery module may be welded to the terminal portions.

The terminal member of each of the battery units of the plurality of battery units may include a positive terminal member and a negative terminal member.

The positive terminal member and the negative terminal member of the terminal member may include dissimilar metals.

The bus bar of the battery module may include a same metal as either of the positive terminal member or the negative terminal member of the terminal member.

The battery units of the plurality of battery units may each further include a welding layer on an upper surface of one of the positive terminal member or the negative terminal member. In some embodiments, the welding layer may include the same metal as that of the bus bar and may be located on an upper surface of one of the positive terminal member or the negative terminal member, including a metal different from that of the welding layer and the bus bar.

The positive terminal member may include aluminum (Al) and the negative terminal member may include copper (Cu); the bus bar may include Al, and the welding layer including Al may be on an upper surface of a terminal portion of the negative terminal member.

BRIEF DESCRIPTION OF THE DRAWINGS

These and/or other aspects of embodiments of the present invention will become apparent and more readily appreciated from the following description of the embodiments, taken in conjunction with the accompanying drawings, of which:

FIG. 4 is a perspective view illustrating a negative (positive) terminal member according to an embodiment of the present invention;

DETAILED DESCRIPTION

Figure 1:
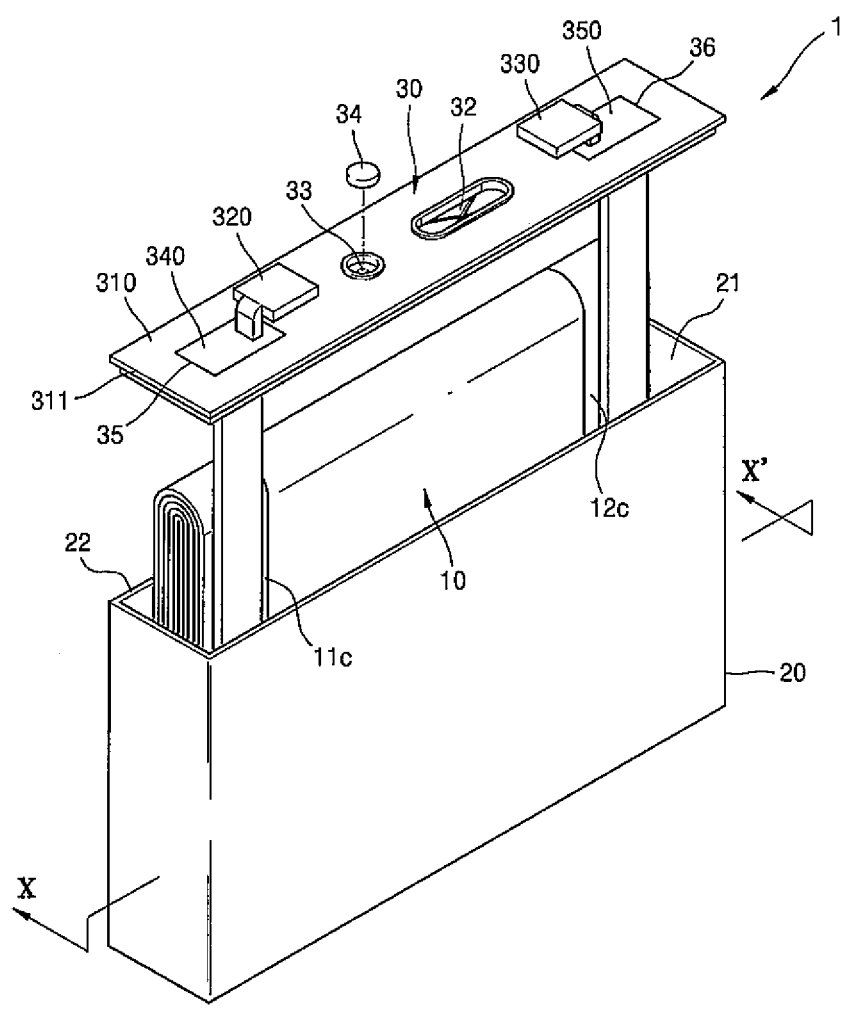
FIG. 1 is an exploded perspective view of a battery unit according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. As used herein, the term "plurality" means greater than one.

Figure 2:
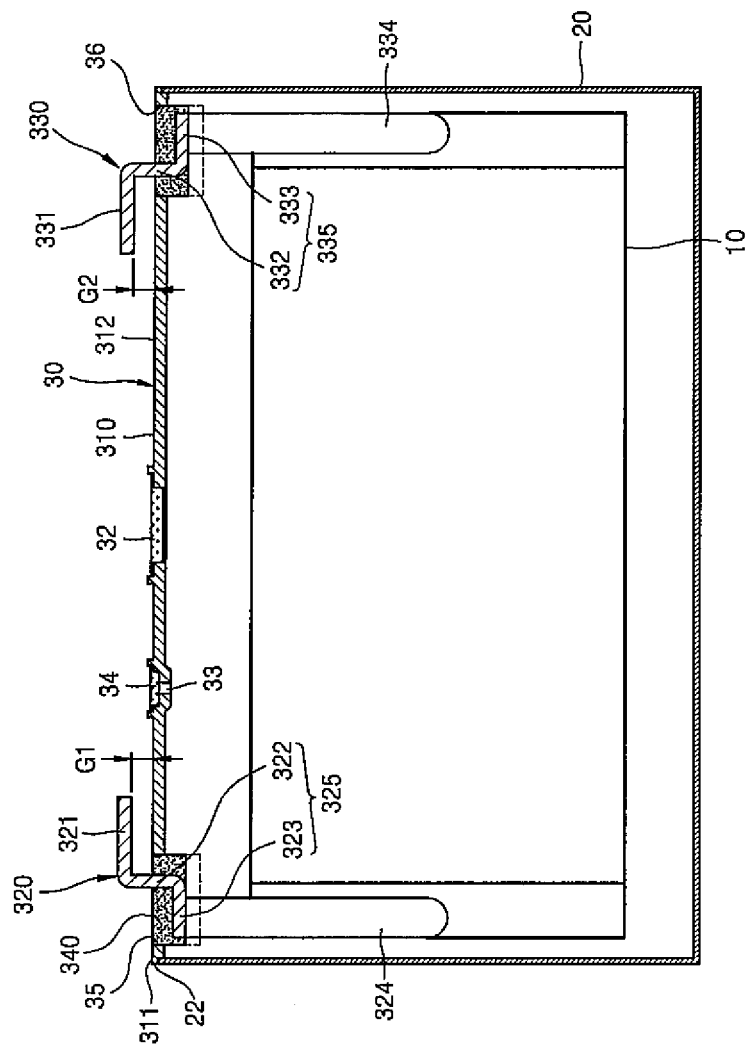
FIG. 2 is a cross-sectional view taken along the line X-X' of FIG. 1.
Figure 3:
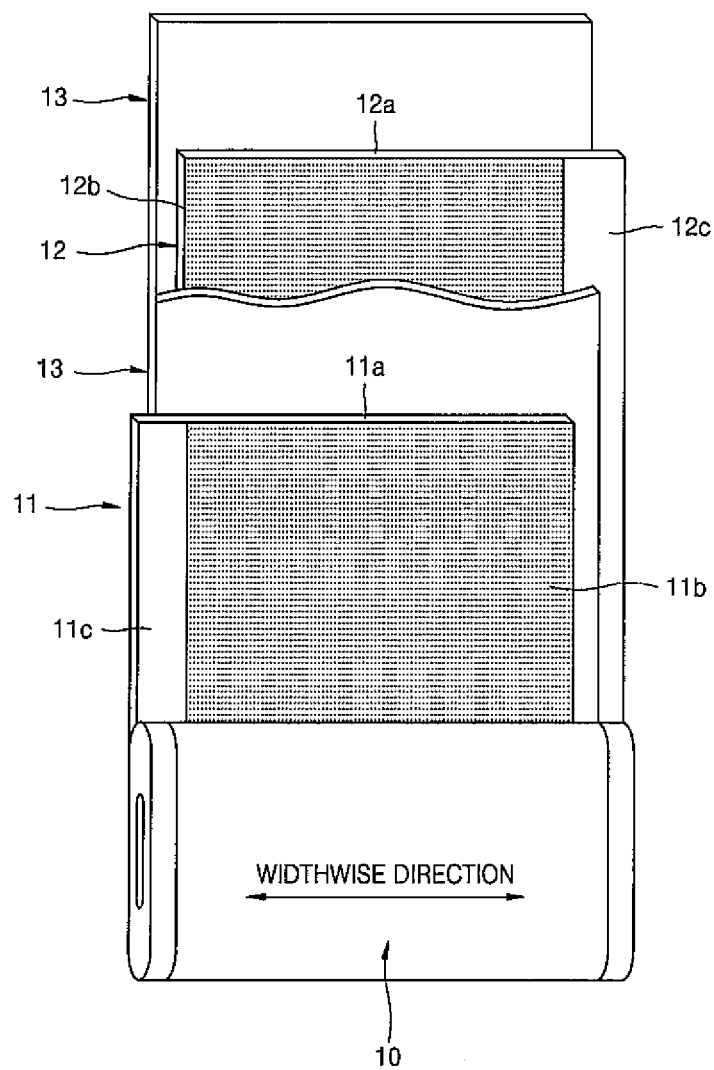
FIG. 3 is a perspective view illustrating an example of an electrode assembly.

FIG. 1 is an exploded perspective view of a battery unit 1 according to an embodiment of the present invention. FIG. 2 is a cross-sectional view taken along the line X-X' of FIG. 1. FIG. 3 is a perspective view illustrating an example of an electrode assembly 10. Referring to FIGS. 1 and 2, the battery unit 1 includes an electrode assembly 10, a case 20 for accommodating the electrode assembly 10, and a cap assembly 30 for closing an upper end of the case 20.

The battery unit 1 may be a secondary battery such as a lithium ion battery. The battery unit 1 may include a variety of battery unit types such as a cylindrical battery unit, a prismatic battery unit, or a polymer battery unit. However, the present invention is not limited to any one of the above battery unit types.

Referring to FIG. 3, the electrode assembly 10 may include a positive plate 11, a negative plate 12, and a separator 13 interposed between the positive plate 11 and the negative plate 12. For example, a stack body of the positive plate 11, the negative plate 12, and the separator 13 may be wound in a jelly-roll shape.

In some embodiments, the positive plate 11 includes a positive current collector portion 11a and a positive active material layer 11b on at least one surface of the positive current collector portion 11a. In some embodiments, a positive active material uncoated portion 11c where the positive active material layer 11b is not coated is at an edge portion of the positive current collector portion 11a in a widthwise direction thereof. In some embodiments, the negative plate 12 includes a negative current collector portion 12a and a negative active material layer 12b on at least one surface of the negative current collector portion 12a. In some embodiments, a negative material uncoated portion 12c where the negative active material layer 12b is not coated is at an edge portion of the negative current collector portion 12a in a widthwise direction thereof. The positive material uncoated portion 11c and the negative material uncoated portion 12c may be arranged to be separated from each other in a widthwise direction of the electrode assembly 10. For example, the positive material uncoated portion 11c and the negative material uncoated portion 12c may be arranged at opposite edge portions of the electrode assembly 10 in the widthwise direction.

The cap assembly 30 includes a cap plate 310, terminal members 320 and 330 that are electrically coupled to the electrode assembly 10, and terminal fixing members 340 and 350 for fixing the terminal members 320 and 330 to the cap plate 310.

The case 20 has an opening 21 for inserting the electrode assembly 10. The opening 21 is closed as the cap plate 310 is coupled to the case 20. In some embodiments, an edge 311 of the cap plate 310 is shape-matched with an upper edge 22 of the case 20 that forms the opening 21. In this embodiment, as the cap plate 310 is coupled to the case 20 by, for example, laser welding, a housing for accommodating the electrode assembly 10 is formed. The cap plate 310 includes a safety vent 32. The safety vent 32 may be designed to be breakable to provide a gas exhaust path when the internal pressure of the case 20 exceeds a preset point. The cap plate 310 includes an electrolyte injection hole 33 for injecting an electrolyte into the case 20. When the injection of an electrolyte is completed, the electrolyte injection hole 33 is closed by a sealing plug 34.

The terminal members 320 and 330 may be a positive terminal member 320 and a negative terminal member 330, respectively. In some embodiments, the terminal members 320 and 330 may be a negative terminal member 320 and a positive terminal member 330, respectively. The positive terminal member 320 and the negative terminal member 330 are electrically coupled to the positive material uncoated portion 11c and the negative material uncoated portion 12c, respectively, of the electrode assembly 10. The positive material uncoated portion 11c and the negative material uncoated portion 12c of the electrode assembly 10 may be electrically exposed to an outside of the case 20 via the positive terminal member 320 and the negative terminal member 330. Terminal insertion portions 35 and 36 may be a positive terminal insertion portion 35 and a negative terminal insertion portion 36, respectively. The terminal insertion portions 35 and 36 are formed by vertically penetrating the cap plate 310. The positive terminal member 320 and the negative terminal member 330 may be inserted into the terminal insertion portions 35 and 36, respectively, and fixed to the cap plate 310 by the positive terminal fixing member 340 and the negative terminal fixing member 350, respectively.

FIG. 4 is a perspective view illustrating the negative (positive) terminal member 330 (320) according to an embodiment of the present invention. In most embodiments, the terminal members 320 and 330 have the same shape or shapes symmetrical to each other. In FIG. 4, reference numerals of constituent elements forming the positive terminal member 320 are indicated in parentheses together with the reference numerals of constituent elements of the negative terminal member 330.

Referring to FIGS. 1, 2, and 4, the positive terminal member 320 may include a positive terminal portion 321, a positive current collector 324, and a positive connection portion 325, coupling the positive terminal portion 321 and the positive current collector 324. The negative terminal member 330 may include a negative terminal portion 331, a negative current collector 334, and a negative connection portion 335, coupling the negative terminal portion 331 and the negative current collector 334. The negative terminal portion 331 and the positive terminal portion 321 extend parallel to an upper surface 312 of the cap plate 310. The positive terminal member 320 and the negative terminal member 330 may be a metal having electrical conductivity. For example, the positive terminal member 320 and the negative terminal member 330 may be formed by cutting and bending a metal panel member into a desired shape by a processing method that includes pressing.

In one embodiment, the negative terminal portion 331 extends in a first direction, for example a horizontal direction, along a major side of the cap plate 310. The negative current collector 334 may extend in a second direction, for example downwardly, in a direction along the thickness direction of the cap plate 310. The negative connection portion 335 may be bent from the negative terminal portion 331 to couple the negative terminal portion 331 and the negative current collector 334. The negative connection portion 335 may include a first negative bending portion 332 bent in the second direction, for example downwardly, from an edge 331a of the negative terminal portion 331 in a third direction, for example in a direction opposite to the first direction, and extended therefrom; and a second negative bending portion 333 bent in the third direction from an edge 332a of the first negative bending portion 332 in the second direction and extended therefrom. The negative current collector 334 may be bent in the second direction, for example downwardly, from an edge 333a of the second negative bending portion 333 in a fourth direction, for example in a direction crossing the first and second directions, in a minor side direction of the cap plate 310, and extended therefrom.

In one embodiment, a large area portion 334b, and not a thickness portion 334c, of the negative current collector 334 is located parallel to the negative material uncoated portion 12c of the electrode assembly 10. A width W of the large area portion 334b may be determined such that a contact area between the large area portion 334b and the negative material uncoated portion 12c is as large as possible. Thus, in this embodiment, a large contact area between the negative current collector 334 and the negative material uncoated portion 12c may be achieved, reducing contact resistance.

Figure 5A:
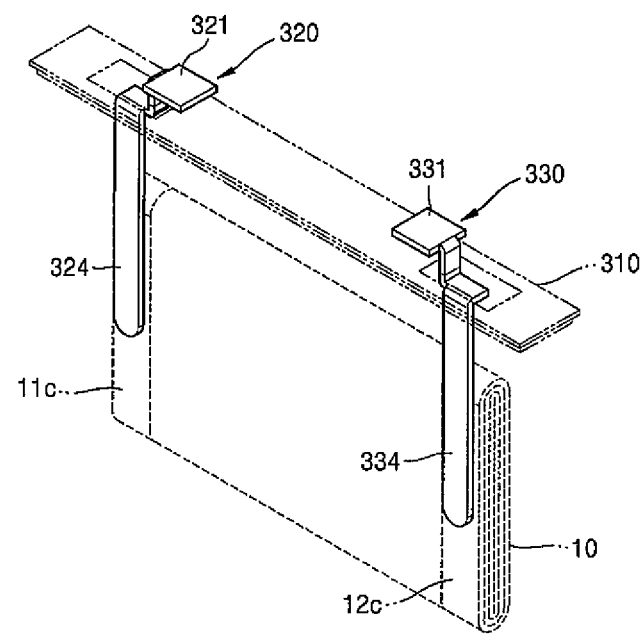
FIGS. 5A to 5C are perspective views illustrating arrangements of a positive terminal member and a positive current collector and a negative terminal member and a negative current collector where the current collectors are coupled on the same surface of an electrode assembly.
Figure 5B:
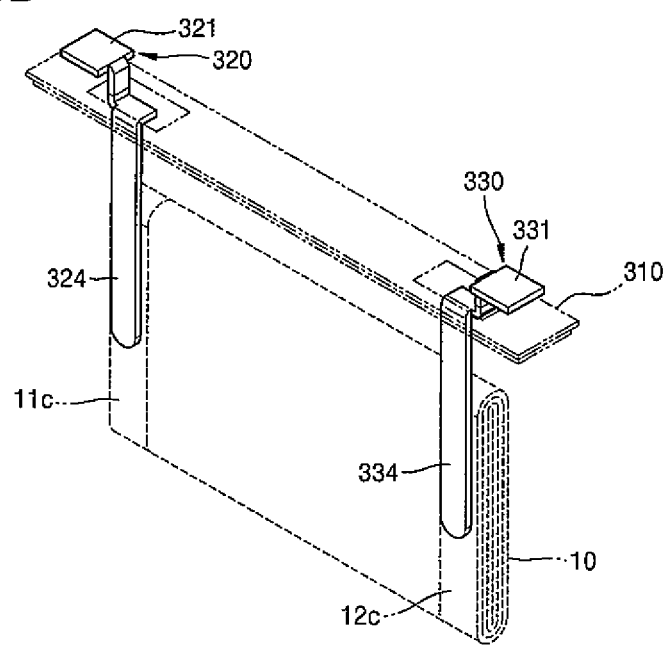
Figure 5C:
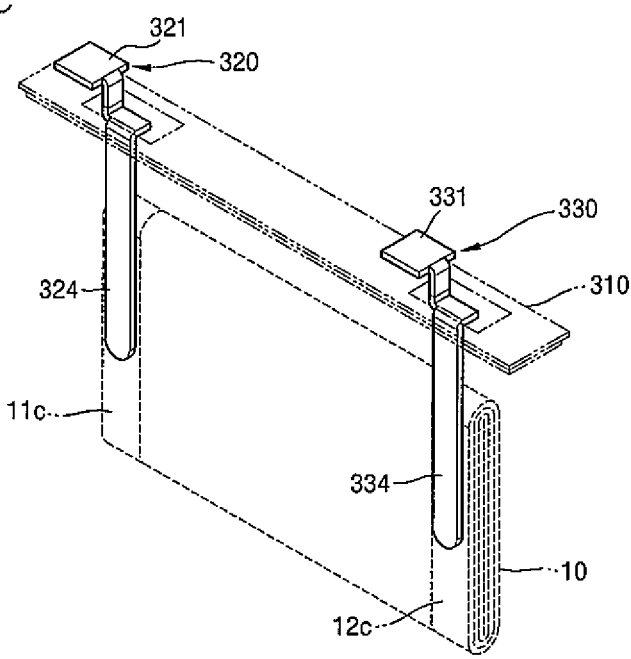

FIGS. 5A to 5C are perspective views illustrating arrangements of the positive terminal member 320 and the positive current collector 324, and the negative terminal member 330 and the negative current collector 334. In FIGS. 5A to 5C, the positive current collector 324 and the negative current collector 334 are coupled on a same surface of the electrode assembly 10.

Referring to FIG. 5A, the positive terminal member 320 and the negative terminal member 330 may be arranged such that the positive terminal portion 321 and the negative terminal portion 331 face each other. Referring to FIG. 5B, the positive terminal member 320 and the negative terminal member 330 may be arranged such that the positive terminal portion 321 and the negative terminal portion 331 face opposite directions. In the embodiments illustrated in FIGS. 5A and 5B, the positive terminal member 320 and the negative terminal member 330 have symmetrical shapes with respect to a major side direction along the cap plate 310. Referring to FIG. 5C, the positive terminal member 320 and the negative terminal member 330 may be arranged such that the positive terminal portion 321 and the negative terminal portion 331 face the same direction. In this embodiment, the shapes of the positive terminal member 320 and the negative terminal member 330 are the same.

Figure 6A:
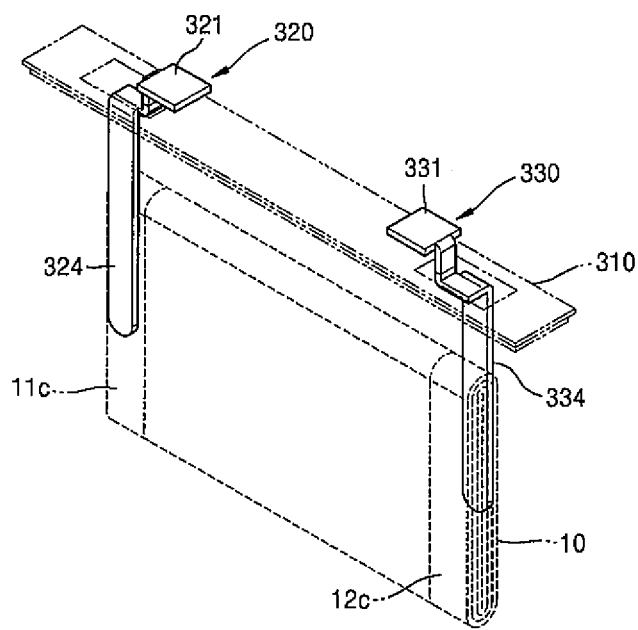
FIGS. 6A to 6C are perspective views illustrating arrangements of a positive terminal member and a positive current collector and a negative terminal member and a negative current collector where the current collectors are coupled on different surfaces of an electrode assembly.
Figure 6B:
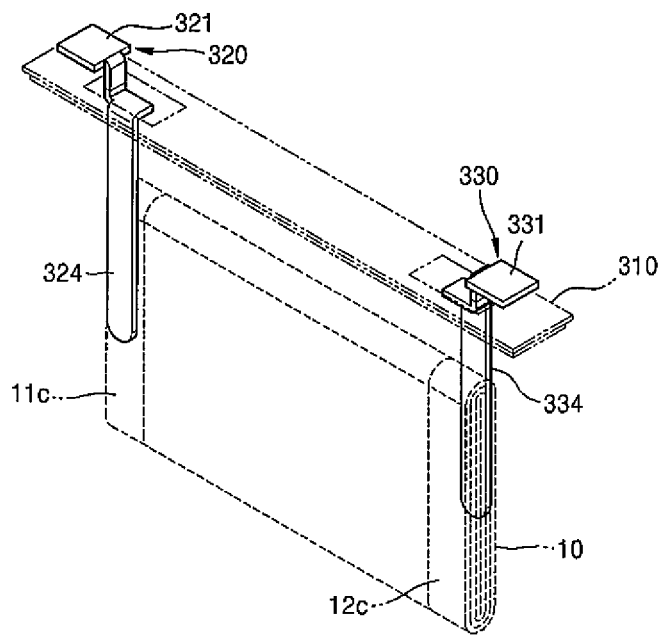
Figure 6C:
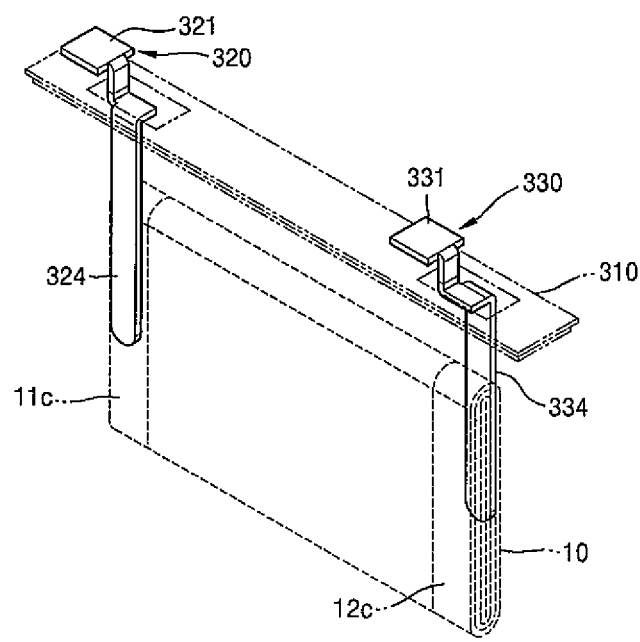

FIGS. 6A to 6C are perspective views illustrating arrangements of the positive terminal member 320 and the positive current collector 324 and the negative terminal member 330 and the negative current collector 334. In FIGS. 6A to 6C, the positive current collector 324 and the negative current collector 334 are coupled on different surfaces of the electrode assembly 10. In the embodiments illustrated in FIGS. 6A and 6B, the positive terminal member 320 and the negative terminal member 330 have the same shape. In the embodiment illustrated in FIG. 6C, the shapes of the positive terminal member 320 and the negative terminal member 330 are symmetrical to each other with respect to the major side direction along the cap plate 310.

In embodiments where the shape of the positive terminal member 320 is the same as that of the negative terminal member 330, as illustrated in FIG. 4, for example, the positive terminal member 320 includes the positive terminal portion 321 extending in the first direction, the positive current collector 324 extending in the second direction, and the positive connection portion 325 bending from the positive terminal portion 321 and coupling the positive terminal portion 321 and the positive current collector 324. The positive connection portion 325 may include a first positive bending portion 322 that is bent in the second direction from an edge 321a of the positive terminal portion 321 in the third direction and extended therefrom, and a second positive bending portion 323 that is bent in the third direction from an edge 322a of the first positive bending portion 322 in the second direction and extended therefrom. The positive current collector 324 may be bent in the second direction from an edge 323a of the second positive bending portion 323 in the fourth direction.

In some embodiments, a large area portion 324b, and not a thickness portion 324c, of the positive current collector 324 is located parallel to the positive material uncoated portion 11c of the electrode assembly 10. The width W of the large area portion 324b may be determined such that a contact area between the large area portion 324b and the positive material uncoated portion 11c is as large as possible. Thus, in this embodiment, a large contact area between the positive current collector 324 and the positive material uncoated portion 11c may be achieved, thereby reducing contact resistance.

In embodiments where the shape of the positive terminal member 320 is symmetrical to the shape of the negative terminal member 330, as indicated by a dotted line of FIG. 4, for example, the positive current collector 324 may be bent in the second direction from a second edge 323b of the second positive bending portion 323 in a fifth direction that is opposite to the fourth direction and extended therefrom.

In some embodiments, the positive terminal member 320 and the negative terminal member 330 are respectively inserted in the positive terminal insertion portion 35 and the negative terminal insertion portion 36. In these embodiments, the positive terminal portion 321 and the negative terminal portion 331 are located above the cap plate 310, whereas the positive current collector 324 and the negative current collector 334 are located under the cap plate 310. In these embodiments, the positive terminal member 320 and the negative terminal member 330 are respectively fixed to the cap plate 310 by a positive terminal fixing member 340 and a negative terminal fixing member 350 that are respectively inserted into the positive terminal insertion portion 35 and the negative terminal insertion portion 36. The positive terminal fixing member 340 and the negative terminal fixing member 350 may be formed of, for example, electrical insulation plastic.

The positive terminal portion 321 and the negative terminal portion 331 may protrude above from the cap plate 310. In some embodiments, gaps G1 and G2 are respectively formed between an upper surface 312 of the cap plate 310 and the positive terminal portion 321 and the negative terminal portion 331, respectively. Accordingly, the positive terminal portion 321 and the negative terminal portion 331 may be fixed to the cap plate 310, and the positive terminal portion 321 and the negative terminal portion 331 may be electrically insulated from the cap plate 310 by the positive terminal fixing member 340 and the negative terminal fixing member 350, respectively.

The electrical insulation may include a plastic. For example, in some embodiments, the electrical insulation includes common plastics such as polyvinyl chloride (PVC), polystyrene, high density polyethylene, and acrylonitrile butadiene styrene copolymer (ABS); common engineering plastics such as polyacetal, polyphenylene oxide (PPO), polyphenylene ether (PPE), polyamide (PA), polycarbonate (PC), and polybutylene terephthalate (PBT); high performance engineering plastics such as U-polymer, polysulfone (PSU), polyphenylene sulfide (PPS), polyetherimide (PEI), polyethersulfone (PES), polyacrylate, polyetheretherketone (PEEK), and polytetrafluoroethylene (PTFE); and super heat resisting engineering plastics such as polyamide-imide (PAI) and polyimide (PI). In one embodiment, the positive terminal fixing member 340 and the negative terminal fixing member 350 may be formed of resin produced by adding 40% fiberglass to PPS.

The positive terminal fixing member 340 and the negative terminal fixing member 350 may be formed by an insert injection molding method. In some embodiments, this method includes inserting the positive terminal member 320 and the negative terminal member 330, into the positive terminal insertion portion 35 and the negative terminal insertion portion 36, respectively. The method further may include injecting a material such as an electrical insulation, for example the resin produced by adding 40% fiberglass to PPS describe above, to mold into the positive terminal insertion portion 35 and the negative terminal insertion portion 36. For example, the embodiments shown in FIGS. 7A to 7C illustrate an example of a process for fixing the positive terminal member 320 and the negative terminal member 330 to the cap plate 310, and for forming the positive and negative terminal fixing members 340 and 350 through an insert injection molding method.

Figure 7A:
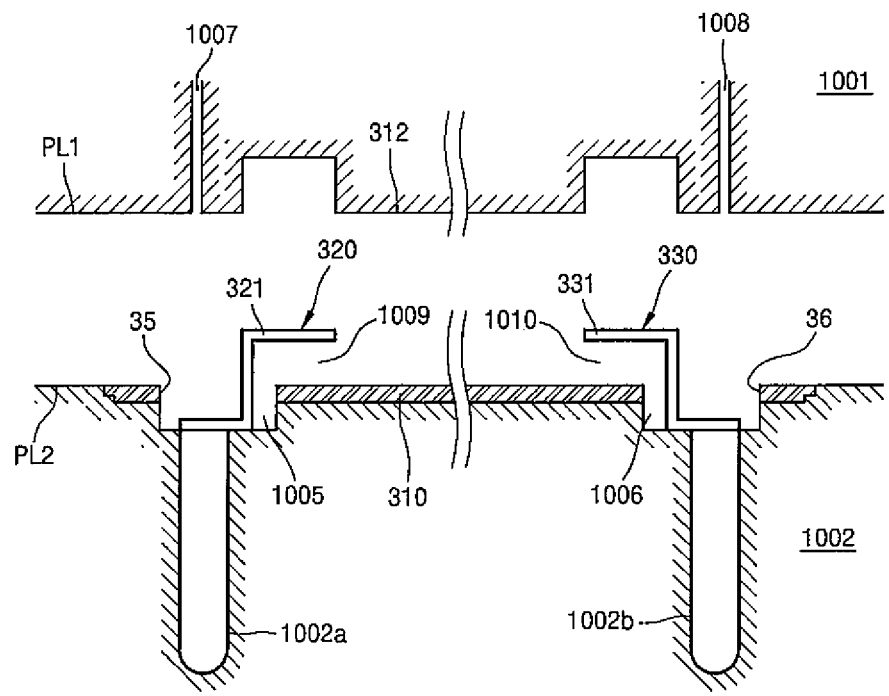
FIGS. 7A to 7C illustrate an example of a process for fixing a positive terminal member and a negative terminal member to a cap plate, and for forming a fixing member through an insert injection molding method.

Referring to FIG. 7A, an upper core 1001 and a lower core 1002 of an injection mold may be separated from each other, thereby opening the injection mold. In some embodiments, the cap plate 310 is placed on a lower parting line PL2 of the lower core 1002, and the positive terminal member 320 and the negative terminal member 330 are inserted into the lower core 1002 by passing through the cap plate 310 via the positive terminal insertion portion 35 and the negative terminal insertion portion 36, respectively. Support holes 1002a and 1002b for respectively supporting the positive current collector 324 and the negative current collector 334 may be provided in the lower core 1002. In these embodiments, when the positive current collector 324 and the negative current collector 334 are supported by the support holes 1002a and 1002b, respectively, the positive terminal portion 321 and the negative terminal portion 331 are separated from the upper surface 312 of the cap plate 310. To prevent gaps 1009 and 1010 between each of the positive terminal portion 321 and the negative terminal portion 331 and the upper surface 312 of the cap plate 310 from being filled with, for example the plastic resin, the gaps 1009 and 1010 may be filled with the upper core 1001. The gaps 1009 and 1010 correspond to under-cut portions with respect to an operational direction of the upper core 1001. The gaps 1009 and 1010 may be filled with slide cores 1003 and 1004 that move in a direction crossing the operational direction of the upper core 1001 when operated. In other words, when the upper core 1001 approaches or is separated from the lower core 1002, the slide cores 1003 and 1004 may move in the direction crossing the operational direction of the upper core 1001, thereby filling the gaps 1009 and 1010 or move in a direction away from the gaps 1009 and 1010, respectively.

Figure 7B:
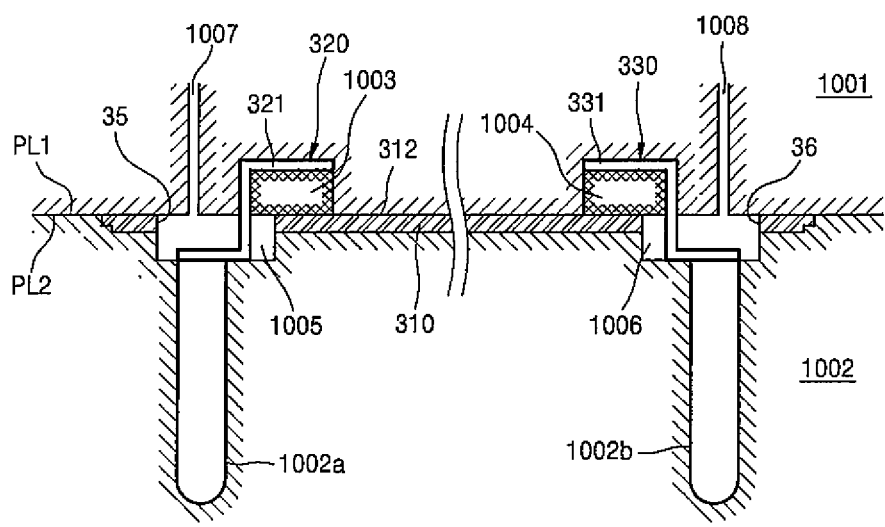

Referring to the embodiment illustrated in FIG. 7B, the upper core 1001 approaches the lower core 1002 once the cap plate 310, the positive terminal member 320, and the negative terminal member 330, are supported on the lower core 1002. When the upper core 1001 and the lower core 1002 are coupled to each other, molding spaces 1005 and 1006, where the positive terminal fixing member 340 and the negative terminal fixing member 350, respectively, are to be formed, may be defined by an upper parting line PL1 and the lower parting line PL2. In these embodiments, the gaps 1009 and 1010 are filled by the slide cores 1003 and 1004, respectively. In these embodiments, the molding spaces 1005 and 1006 are filled with a material, for example resin, through gates 1007 and 1008. In these embodiments, once a predetermined cooling time has passed and the material, for example resin, filling the molding spaces 1005 and 1006 has cured, the positive terminal fixing member 340 and the negative terminal fixing member 350, fixing the positive terminal member 320 and the negative terminal member 330 to the cap plate 310, are formed.

Figure 7C:
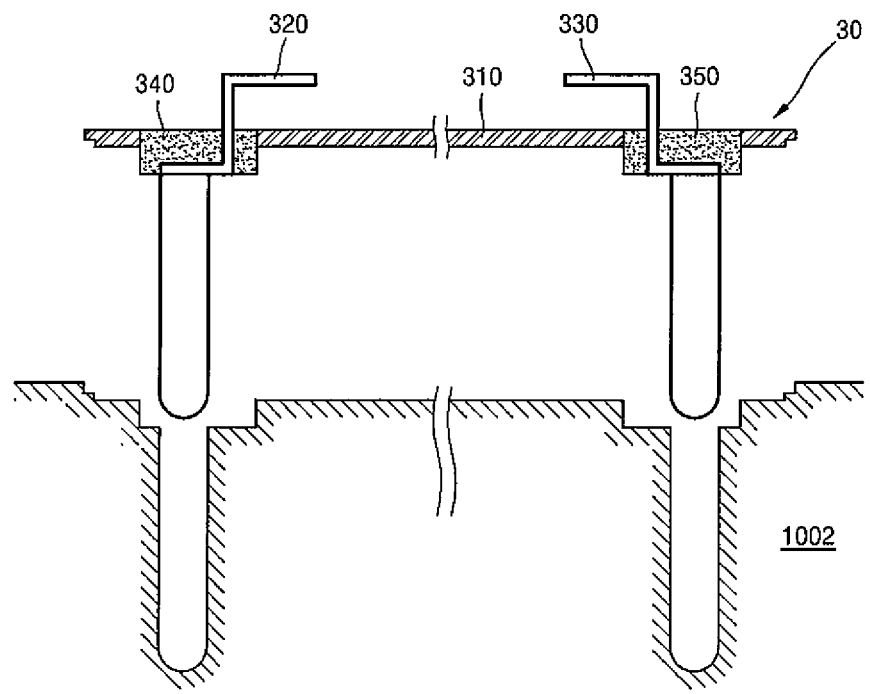

Next, referring to the embodiment illustrated in FIG. 7C, the upper core 1001 is separated from the lower core 1002, and the cap assembly 30 is separated from the lower core 1002.

Referring back to FIG. 2, the positive terminal portion 321 and the negative terminal portion 331 may be separated from the upper surface 312 of the cap plate 310, forming gaps G1 and G2 therebetween. The gaps G1 and G2 may be the same. The positive terminal fixing member 340 and the negative terminal fixing member 350 partially or entirely surround the positive connection portion 325 and the negative connection portion 335, respectively. Gaps between the positive connection portion 325 and the negative connection portion 335, and edges of the positive terminal insertion portion 35 and the negative terminal insertion portion 36 of the cap plate 310, are filled with a material, for example a resin, forming the positive terminal fixing member 340 and the negative terminal fixing member 350, respectively. Accordingly, in these embodiments, the positive terminal member 320 and the negative terminal member 330 may be electrically and entirely insulated from the cap plate 310. The second positive bending portion 323 and the second negative bending portion 333 may be partially or entirely (refer to the dashed line of FIG. 2) buried in the positive terminal fixing member 340 and the negative terminal fixing member 350, respectively. In these embodiments, as the positive connection portion 325 and the negative connection portion 335, each having bending portions, are buried in the positive terminal fixing member 340 and the negative terminal fixing member 350, respectively, the positive terminal member 320 and the negative terminal member 330 are each respectively coupled to the cap plate 310 by the positive terminal fixing member 340 and the negative terminal fixing member 350, thereby improving a coupling strength between each of the positive terminal member 320 and the negative terminal member 330 with the cap plate 310.

The completed cap assembly 30 may include the electrode assembly 10, the positive terminal member 320, and the negative terminal member 330 electrically coupled to one another. In some embodiments, the positive current collector 324 is electrically coupled to the positive material uncoated portion 11*c*, whereas the negative current collector 334 is electrically coupled to the negative material uncoated portion 12*c*. The coupling of the positive current collector 324 to the positive material uncoated portion 11*c* and the coupling of the negative current collector 334 to the negative material uncoated portion 12*c* may be, for example, by ultrasound welding.

Once the cap assembly 30 and the electrode assembly 10 are coupled to each other, the electrode assembly 10 may be inserted into the case 20 through the opening 21. In these embodiments, once the cap plate 310 is coupled to the case 20 by, for example, a laser welding method, the opening 21 is closed, electrically exposing the electrode assembly 10 to the outside of the case 20 via the positive terminal member 320 and the negative terminal member 330. After the opening 21 is closed, an electrolyte may be injected through the electrolyte injection hole 33, and the electrolyte injection hole 33 may be closed by using the sealing plug 34, thus completing the manufacturing of the battery unit 1.

Figure 8:
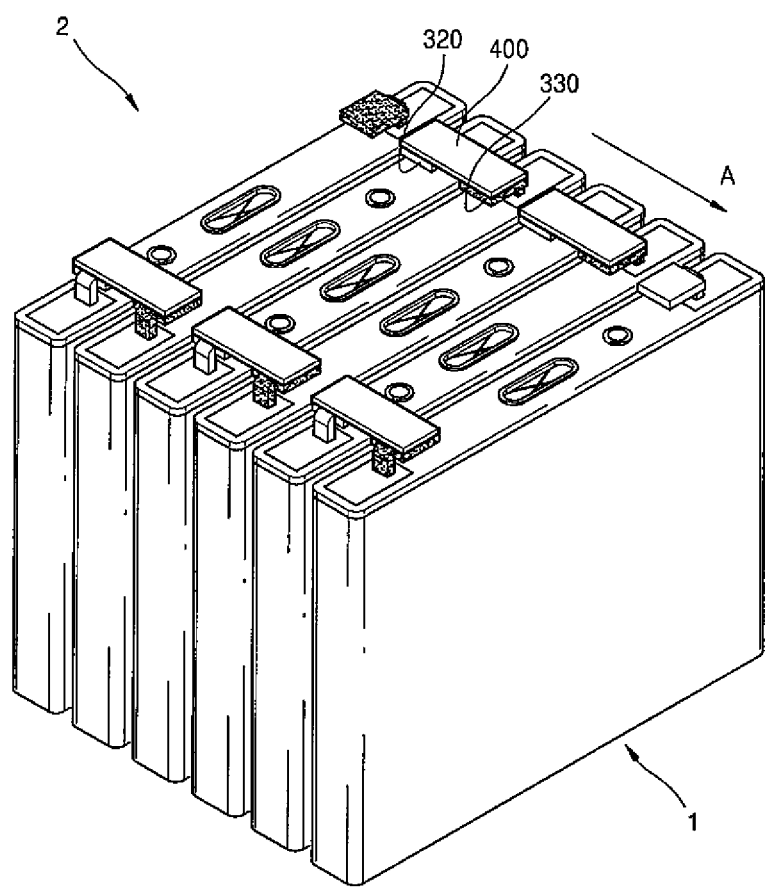
FIG. 8 is a perspective view of a battery module according to an embodiment of the present invention.

According to the above-described battery unit 1, each of the positive terminal member 320 and the negative terminal member 330 may be formed by a single metal plate. In other words, all components of the positive terminal member 320 and the negative terminal member 330 from the positive current collector 324 and the negative current collector 334 to the positive terminal portion 321 and the negative terminal portion 331 may be formed of the same metal. Thus, since the positive terminal member 320 and the negative terminal member 330 may be formed without the need for a coupling process by welding, etc., the manufacturing cost may be reduced while maintaining an electrical characteristic of a current path from the positive current collector 324 and the negative current collector 334 to the positive terminal portion 321 and the negative terminal portion 331, respectively. Also, as the positive terminal member 320 and the negative terminal member 330 are coupled to the cap plate 310 by the insert injection molding method using, for example plastic or resin, the cap plate 310 may be coupled to the respective positive terminal member 320, negative terminal member 330, with an electrical insulation therebetween. Also, in embodiments where the positive terminal portion 321 and the negative terminal portion 331 extend in a direction parallel with each other and with the upper surface 312 of the cap plate 310, for example in a horizontal direction, this may allow for a more streamlined coupling of the positive terminal portion 321 and the negative terminal portion 331 of neighboring battery units 1 forming a battery module 2 as illustrated in FIG. 8, and described below. Also, the positive terminal portion 321 and the negative terminal portion 331, extending, for example, in a horizontal direction, may be advantageous in allowing a sufficient area for welding.

FIG. 8 is a perspective view of the battery module 2 according to an embodiment of the present invention. Referring to FIG. 8, the battery module 2 may include a plurality of battery units 1 arranged in a row. For example, the battery module 2 may include the battery units 1 arranged in one direction or in a stacked structure, arranging the battery units 1 in one or more rows.

The battery units 1 may be electrically coupled to one another in series or in parallel by coupling the positive terminal portion 321 and the negative terminal portion 331 of neighboring battery units 1. For example, as illustrated in FIG. 8, the battery units 1 may be coupled to each other in series by coupling the terminal portions of different polarities of a pair of neighboring battery units 1 by using a bus bar 400. In this embodiment, the battery units 1 may be arranged such that the polarities of the terminal portions thereof are alternately arranged in a coupling direction A of the bus bar 400. The bus bar 400 may be coupled to the positive terminal portion 321 and the negative terminal portion 331 by welding, for example. Although it is not illustrated in FIG. 8, the battery units 1 may be coupled in parallel to each other by coupling the terminal portions of the same polarity of a pair of neighboring battery units 1 by using a bus bar 400.

The bus bar 400 may be formed of a metal material exhibiting superior conductivity. Also, the bus bar 400 may be formed of a metal material having a uniform composition. When the positive terminal portion 321 and the negative terminal portion 331 each are formed of a similar metal to that of the bus bar 400, each of the positive terminal portion 321 and the negative terminal portion 331 and the bus bar 400 may be coupled by welding the similar metals. In some embodiments, the similar metal may include, for example, aluminum (Al) and/or copper (Cu).

The positive terminal portion 321 and the negative terminal portion 331 may be formed of dissimilar metals. When the bus bar 400 is formed of a metal material different from those of the positive terminal portion 321 and/or the negative terminal portion 331, the coupling between these dissimilar metals may be formed between the positive terminal portion 321 and the bus bar 400 and between the negative terminal portion 331 and the bus bar 400, respectively. When the bus bar 400 is formed of a similar metal as any one of the positive terminal portion 321 and/or the negative terminal portion 331, the coupling between dissimilar metals may be between the bus bar 400 and the other, not similar metal, one of the positive terminal portion 321 and the negative terminal portion 331.

For example in one embodiment, laser welding between similar metals may result in a sufficient welding strength; example similar metals may include Al—Al or Cu—Cu. However, if the laser welding in these embodiments is between dissimilar metals such as Al—Cu, for example, weldability is degraded and a sufficient welding strength may not be achieved. In embodiments having dissimilar metals, friction stir welding (FSW) may be performed instead of laser welding. FSW uses a welding tool (not shown) inserted in a base member rotated at a high speed. The base members around the welding tool may be softened due to frictional heat between the welding tool and the base members. A flow of the base members, such as plastic, resulting from an agitation operation by the rotating welding tool allows two base members to be forcibly mixed with each other with respect to a boundary surface of the two base members. Thus, FSW may provide a sufficient welding strength between dissimilar metals that have lower weldability.

For example, in one embodiment, the positive terminal portion 321 may be formed of Al that is electrochemically suitable for a positive electrode, the negative terminal portion 331 may be formed of Cu that is electrochemically suitable for a negative electrode, and the bus bar 400 may be formed of Al. The positive terminal portion 321 and the bus bar 400 may be coupled by laser welding, whereas the negative terminal portion 331 and the bus bar 400 may be coupled by FSW. Accordingly, in this embodiment, a sufficient welding strength may result between the bus bar 400 and each of the positive terminal portion 321 and the negative terminal portion 331. In other embodiments, both of the positive terminal portion 321 and the negative terminal portion 331 may be coupled to the bus bar 400 by FSW.

Figure 9:
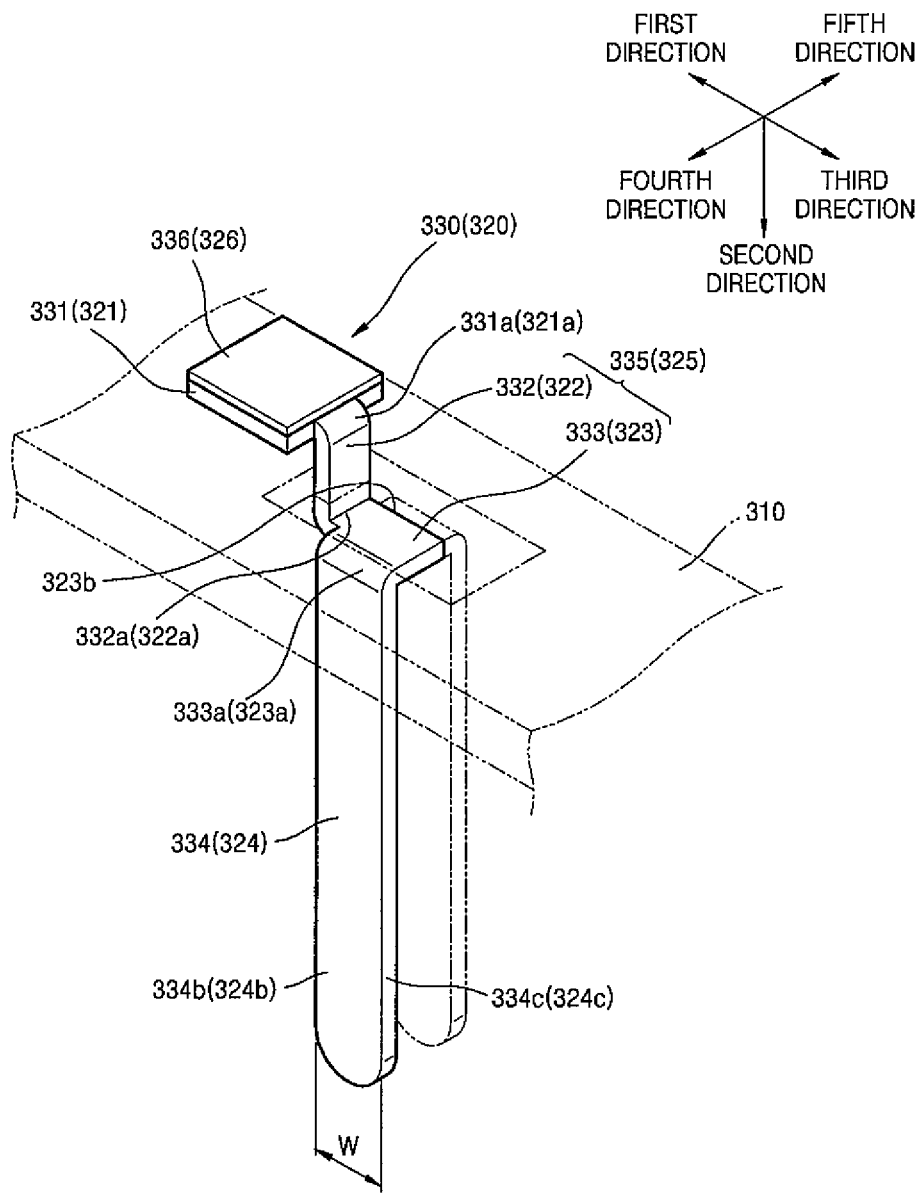
FIG. 9 is a perspective view of terminal members according to another embodiment of the present invention.

FIG. 9 is a perspective view of the positive terminal member 320 and the negative terminal member 330 applied to the battery unit 1, according to another embodiment of the present invention. When the positive terminal portion 321 and the negative terminal portion 331 are of dissimilar metals, and the bus bar 400 is of a metal that is the same as any one of the positive terminal portion 321 and the negative terminal portion 331, the other one of the positive terminal portion 321 and the negative terminal portion 331 may include a welding layer 326 or 336 of a similar metal to the bus bar 400. For example, when the positive terminal portion 321 is formed of Al that is electrochemically suitable for a positive electrode, the negative terminal portion 331 may be formed of Cu that is electrochemically suitable for a negative electrode, and the bus bar 400 may be formed of Al, the welding layer 336 formed of Al that is the same as the bus bar 400 may be on an upper surface of the negative terminal member 330. When the bus bar 400 is formed of Cu, the welding layer 326 formed of Cu that is the same as the bus bar 400 may be on the upper surface of the positive terminal portion 321. The welding layers 326 and 336 may be on the positive terminal portion 321 and the negative terminal portion 331, respectively, by laser welding or FSW. In some embodiments, the gaps G1 and G2, illustrated in FIG. 2, may be different from each other to allow for the final heights of the upper surfaces of the positive terminal portion 321 and the negative terminal portion 331 to be the same. According to the above embodiment, since the coupling between the bus bar 400 and each of the positive terminal portion 321 and the negative terminal portion 331 is between similar metals, a sufficient welding strength may result even by laser welding.

Figure 10:
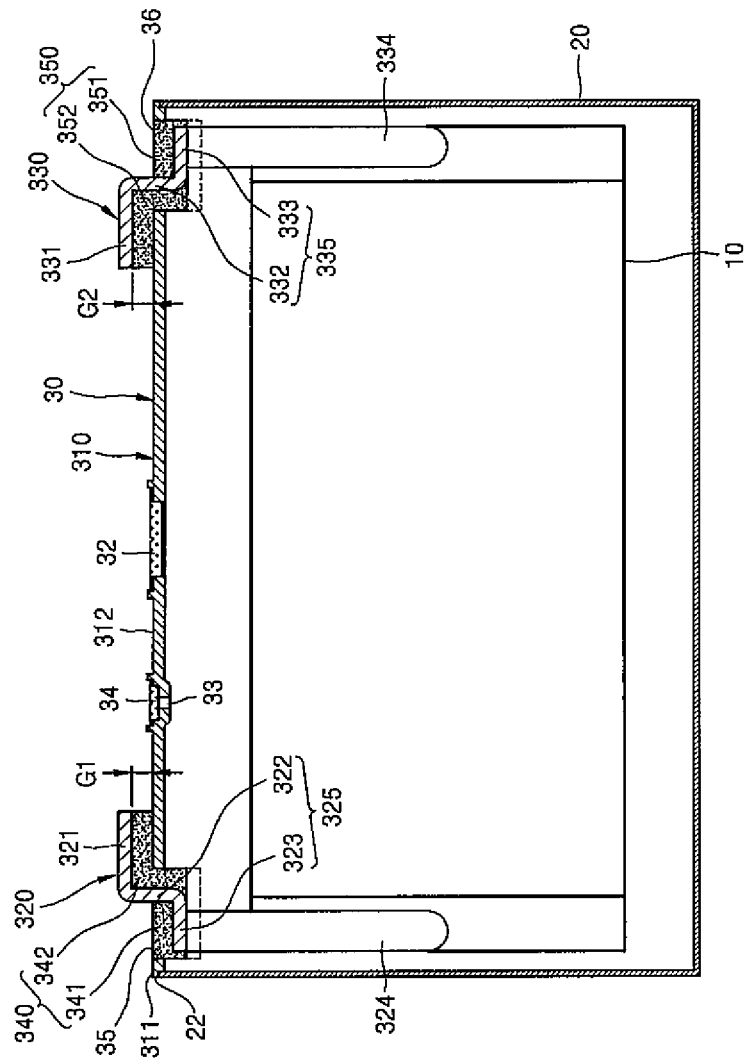
FIG. 10 is a cross-sectional view illustrating a battery unit according to an embodiment of the present invention.
Figure 11:
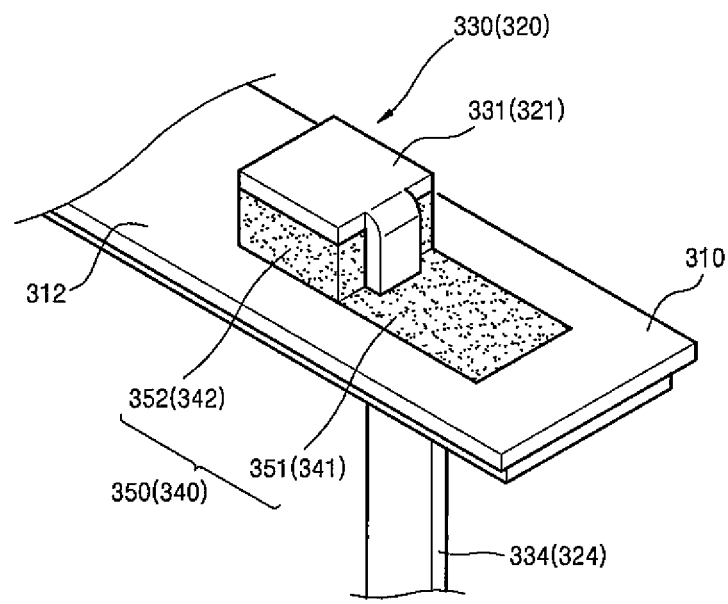
FIG. 11 is a perspective view illustrating a part of a cap assembly of FIG. 10.

FIG. 10 is a cross-sectional view illustrating the battery unit 1 according to an embodiment of the present invention. FIG. 11 is a perspective view illustrating a part of the cap assembly 30 of FIG. 10. Referring to FIGS. 10 and 11, the positive terminal fixing member 340 and the negative terminal fixing member 350 are respectively located between the positive terminal insertion portion 35 and the negative terminal insertion portion 36, and the gaps G1 and G2 between the positive terminal portion 321 and the negative terminal portion 331 and the upper surface 312 of the cap plate 310. In other words, the positive terminal fixing member 340 and the negative terminal fixing member 350 respectively include first fixing portions 341 and 351 that fill the positive terminal insertion portion 35 and the negative terminal insertion portion 36, and second fixing portions 342 and 352 that fill the gaps G1 and G2 between each of the positive terminal portion 321 and the negative terminal portion 331 and the upper surface 312 of the cap plate 310.

Figure 12:
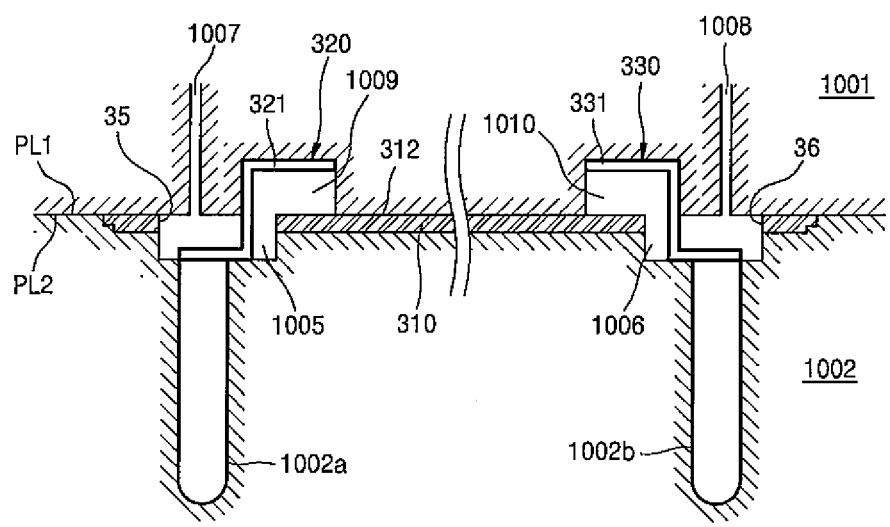
FIG. 12 is a cross-sectional view illustrating an example of a process for fixing a positive terminal member and a negative terminal member on the cap plate by an insert injection molding method and for forming the fixing member of FIG. 10.

The positive and negative terminal fixing members 340 and 350 may be formed by an insert injection molding method. For example, as illustrated in FIG. 12, in embodiments where the upper core 1001 and the lower core 1002 of an injection mold are separated from each other, opening the mold, the cap plate 310 is inserted in the lower core 1002, and the positive terminal member 320 and the negative terminal member 330 are inserted into the lower core 1002 by penetrating the cap plate 310 respectively via the positive terminal insertion portion 35 and the negative terminal, insertion portion 36. Then, the upper core 1001 may approach the lower core 1002. When the upper core 1001 and the lower core 1002 are coupled to each other, molding spaces 1005 and 1006, where the positive and negative terminal fixing members 340 and 350 are respectively formed, are defined by the upper parting line PL1 and the lower parting line PL2. Gaps 1009 and 1010 between the positive terminal portion 321 and the negative terminal portion 331, respectively, and the upper surface 312 of the cap plate 310 are coupled to the respective molding spaces 1005 and 1006, thereby allowing the gaps 1009 and 1010 to be filled with a material, for example with resin. In some embodiments, a resin is injected into the molding spaces 1005 and 1006 and the gaps 1009 and 1010 via the gates 1007 and 1008. In these embodiments, once a predetermined cooling time has passed and the material, for example resin, filling the molding spaces 1005 and 1006 and the gaps 1009 and 1010 has cured, the positive and negative terminal fixing members 340 and 350, respectively, including the first fixing portions 341 and 351 and the second fixing portions 342 and 352 that fix the positive and negative terminal members 320 and 330 to the cap plate 310, are formed. Next, the upper core 1001 may be separated from the lower core 1002, and the cap assembly 30 may be separated from the lower core 1002.

According to these embodiments, the coupling strength between the cap plate 310 and each of the positive terminal member 320 and the negative terminal member 330 may be improved. In other words, as the second fixing portions 342 and 352 respectively increase the contact areas between the positive terminal member 320 and the negative terminal member 330 with the cap plate 310 and the positive terminal fixing member 340 and the negative terminal fixing member 350, respectively, the coupling strength between the cap plate 310 and each of the positive terminal member 320 and the positive terminal fixing member 340, and each of the negative terminal member 330 and the negative terminal fixing member 350 may be improved. Also, when the bus bar 400 is coupled to the positive terminal portion 321 and the negative terminal portion 331 by a method such as welding, a downward pressure may be applied by the welding tool to the positive terminal portion 321 and the negative terminal portion 331. In this embodiment, since the positive terminal portion 321 and the negative terminal portion 331 are supported on the cap plate 310 by the second fixing portions 342 and 352, the possibility that the positive terminal fixing member 340 and the negative terminal fixing member 350 will separate from the positive terminal insertion portion 35 and the negative terminal insertion portion 36, respectively, may be reduced.

In some embodiments, in a welding process, heat transferred to the positive terminal portion 321 and the negative terminal portion 331 may be distributed through the second fixing portions 342 and 352.

Since the positive terminal portion 321 and the negative terminal portion 331 are supported by the second fixing portions 342 and 352, in some embodiments, the positive terminal portion 321 and the negative terminal portion 331 may be prevented from being bent downwardly during the process of welding the bus bar 400. Accordingly, in these embodiments, the coupling quality between the bus bar 400 and each of the positive terminal portion 321 and the negative terminal portion 331 may be improved. Also, electrical insulation between the cap plate 310 and each of the positive terminal member 320 and the negative terminal member 330 may be improved in these embodiments.

Figure 13:
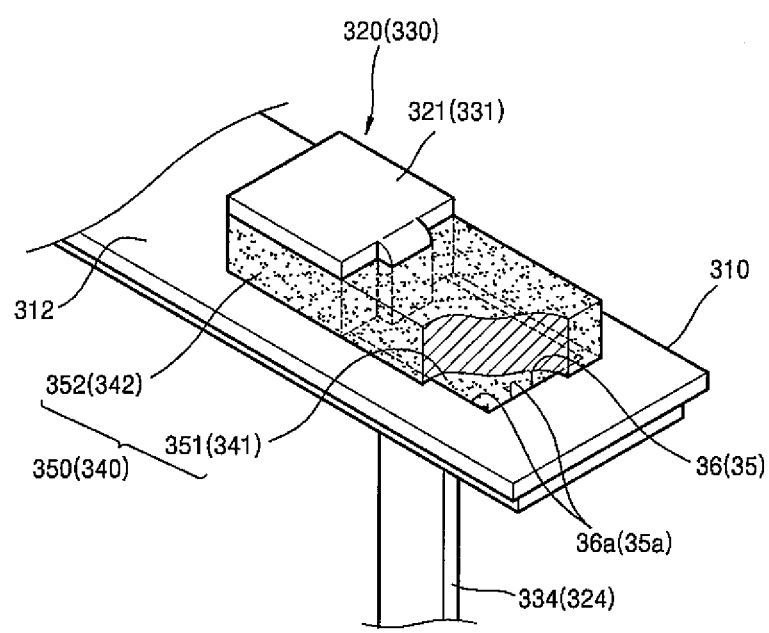
FIG. 13 is a perspective view illustrating a part of a cap assembly according to another embodiment of the present invention.

FIG. 13 is a perspective view illustrating a part of the cap assembly 30 according to another embodiment of the present invention. Referring to FIG. 13, the second fixing portions 342 and 352 may extend over the first fixing portions 341 and 351, thereby completely covering the positive and negative terminal insertion portions 35 and 36. In other words, the second fixing portions 342 and 352 may extend over edges 35a and 36a of the positive and negative terminal insertion portions 35 and 36, respectively, in a major side direction and in a minor side direction of the cap plate 310. According to the above embodiment, the intrusion of moisture into the case 20 through the gaps between the positive and negative terminal fixing members 340 and 350 and the positive and negative terminal insertion portions 35 and 36 is prevented, reducing the possibility of corrosion of the cap plate 310, the electrode assembly 10, the positive and negative current collectors 324 and 334, and the case 20.

It should be understood that the exemplary embodiments described herein should be considered in a descriptive sense only and not for purposes of limitation. Descriptions of features or aspects within each embodiment should typically be considered as available for other similar features or aspects in other embodiments. The scope of the present disclosure is defined in the claims and their equivalents.

What is claimed is:

1. A battery unit comprising:
  a case accommodating an electrode assembly and having an opening;
  a cap plate covering the opening, the cap plate having a terminal insertion portion;
  a terminal member inserted into the case through the terminal insertion portion from an outside of the case and coupled to the electrode assembly, the terminal member comprising:
    a current collector electrically coupled to the electrode assembly;
    a terminal portion extending parallel to an upper surface of the cap plate to an outside of the cap plate; and
    a connection portion electrically coupled to the current collector and to the terminal portion, the connection portion comprising:
      a first bending portion extending downwardly from the terminal portion; and
      a second bending portion extending from the first bending portion to be parallel to the upper surface of the cap plate; and
  a fixing member in the terminal insertion portion and fixing the terminal member to the cap plate, the fixing member comprising injection-molded plastic resin in the terminal insertion portion and surrounding the terminal member,
  wherein a lower portion of the first bending portion is buried in the fixing member, an upper portion of the first bending portion is exposed outside the fixing member, and a lower surface of the second bending portion is exposed below the fixing member.

2. The battery unit of claim 1, wherein the terminal portion is separated from the upper surface of the cap plate.

3. The battery unit of claim 2, wherein the terminal portion extends in a direction parallel to the upper surface of the cap plate.

4. The battery unit of claim 3, wherein the current collector extends downwardly from an edge of the second bending portion in a direction along a minor side of the cap plate.

5. The battery unit of claim 4, wherein the second bending portion is partially buried in the fixing member.

6. The battery unit of claim 2, wherein the fixing member comprises a first fixing portion filling the terminal insertion portion and a second fixing portion filling a gap between the terminal portion and the upper surface of the cap plate.

7. The battery unit of claim 6, wherein the second fixing portion extends to an upper portion of the first fixing portion.

8. The battery unit of claim 7, wherein the second fixing portion is located over an edge of the terminal insertion portion.

9. The battery unit of claim 1, wherein the terminal member comprises a positive terminal member and a negative terminal member.

10. The battery unit of claim 9, wherein the positive terminal member and the negative terminal member each comprise a metal, the metal of the positive terminal member and the negative terminal member being the same.

11. The battery unit of claim 10, wherein the positive terminal member and the negative terminal member comprise dissimilar metals.

12. The battery unit of claim 11, wherein the positive terminal member comprises aluminum (Al) and the negative terminal member comprises copper (Cu).

13. The battery unit of claim 11, wherein the battery unit further comprises a welding layer on an upper surface of one of the positive terminal member or the negative terminal member, the welding layer comprising a metal that is the same metal as that of any one of the positive terminal member or the negative terminal member and being located on an upper surface of the one of the positive terminal member or the negative terminal member comprising a dissimilar metal than the welding layer.

14. A battery module comprising:
a plurality of battery units, the battery units each comprising:
a case accommodating an electrode assembly and having an opening;
a cap plate covering the opening, the cap plate having a terminal insertion portion;
a terminal member inserted into the case through the terminal insertion portion from an outside of the case and coupled to the electrode assembly, the terminal member comprising:
a current collector electrically coupled to the electrode assembly;
a terminal portion extending parallel to an upper surface of the cap plate to an outside of the cap plate; and
a connection portion electrically coupled to the current collector and to the terminal portion, the connection portion comprising:
a first bending portion extending downwardly from the terminal portion; and
a second bending portion extending from the first bending portion to be parallel to the upper surface of the cap plate;
a fixing member in the terminal insertion portion and fixing the terminal member to the cap plate, the fixing member comprising injection-molded plastic resin in the terminal insertion portion and surrounding the terminal member; and
a bus bar coupling the terminal portions of the battery units of the plurality of battery units to respective neighboring battery units of the plurality of battery units,
wherein a lower portion of the first bending portion is buried in the fixing member an upper portion of the first bending portion is exposed above the fixing member, and a lower surface of the second bending portion is exposed below the fixing member.

15. The battery module of claim 14, wherein the terminal portion is separated from the upper surface of the cap plate.

16. The battery module of claim 15, wherein the terminal portion extends in a direction parallel to the upper surface along a major side of the cap plate.

17. The battery module of claim 15, wherein the fixing member comprises:
a first fixing portion filling the terminal insertion portion; and
a second fixing portion that filling a gap between the terminal portion and the upper surface of the cap plate.

18. The battery module of claim 17, wherein the second fixing portion extends to an upper portion of the first fixing portion.

19. The battery module of claim 18, wherein the second fixing portion is located over an edge of the terminal insertion portion.

20. The battery module of claim 14, wherein the bus bar is welded to the terminal portions.

21. The battery module of claim 20, wherein the terminal member comprises a positive terminal member and a negative terminal member.

22. The battery module of claim 21, wherein the positive terminal member and the negative terminal member comprise dissimilar metals.

23. The battery module of claim 22, wherein the bus bar comprises a same metal as either the positive terminal member or the negative terminal member.

24. The battery module of claim 23, wherein the battery units each further comprise a welding layer on an upper surface of one of the positive terminal member or the negative terminal member, the welding layer comprising the same metal as that of the bus bar and being located on an upper surface of one of the positive terminal member or the negative terminal member comprising a metal different from that of the welding layer and the bus bar.

25. The battery module of claim 24, wherein the positive terminal member comprises aluminum (Al) and the negative terminal member comprises copper (Cu), the bus bar comprises Al, and the welding layer comprising Al is on the upper surface of a terminal portion of the negative terminal member.

26. The battery unit of claim 1, wherein at least a portion of an upper surface of the fixing member is at the upper surface of the cap plate.

* * * * *